E. E. UNDERWOOD.
PHOTOGRAPHIC SHUTTER.
APPLICATION FILED JAN. 24, 1919.
1,354,526.
Patented Oct. 5, 1920.
2 SHEETS—SHEET 1.
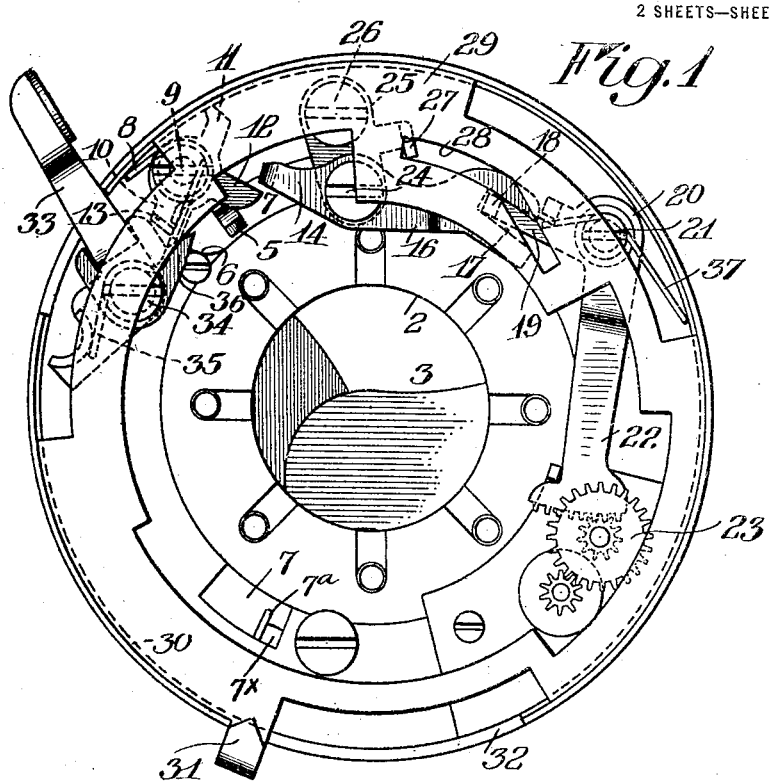
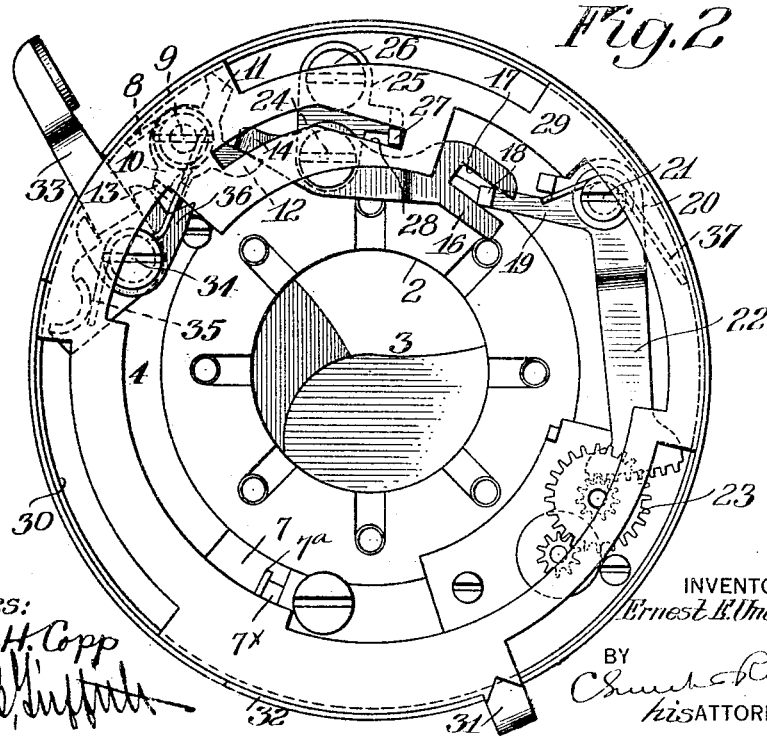
Witnesses:
Nelson H. Copp
INVENTOR
Ernest E. Underwood
BY
his ATTORNEYS

E. E. UNDERWOOD.
PHOTOGRAPHIC SHUTTER.
APPLICATION FILED JAN. 24, 1919.

1,354,526.

Patented Oct. 5, 1920.
2 SHEETS—SHEET 2.

Witnesses
Nelson H. Copp

INVENTOR
Ernest E. Underwood
BY
his ATTORNEYS

UNITED STATES PATENT OFFICE.

ERNEST E. UNDERWOOD, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

1,354,526.    Specification of Letters Patent.    Patented Oct. 5, 1920.

Application filed January 24, 1919. Serial No. 272,925.

*To all whom it may concern:*

Be it known that I, ERNEST E. UNDERWOOD, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to photography and more particularly to photographic shutters and it has for its object to provide a simple and accurate retarding device for controlling the automatically timed exposures, which device will have a considerable range of variation as a result of relatively slight adjusting movements. To these and other ends the invention resides in certain improvements and combinations of parts, all as will be hereinafter more fully described, the novel features being pointed out in the claims at the end of the specification.

In the drawings:

Figure 1 is a front view of a shutter constructed in accordance with and illustrating one embodiment of my invention, the cover plate or front being removed and the parts being in normal position for an instantaneous exposure;

Fig. 2 is a similar view with the controlling member set for an automatically timed exposure of maximum duration;

Similar reference numerals throughout the several views indicate the same parts.

Figure 3:
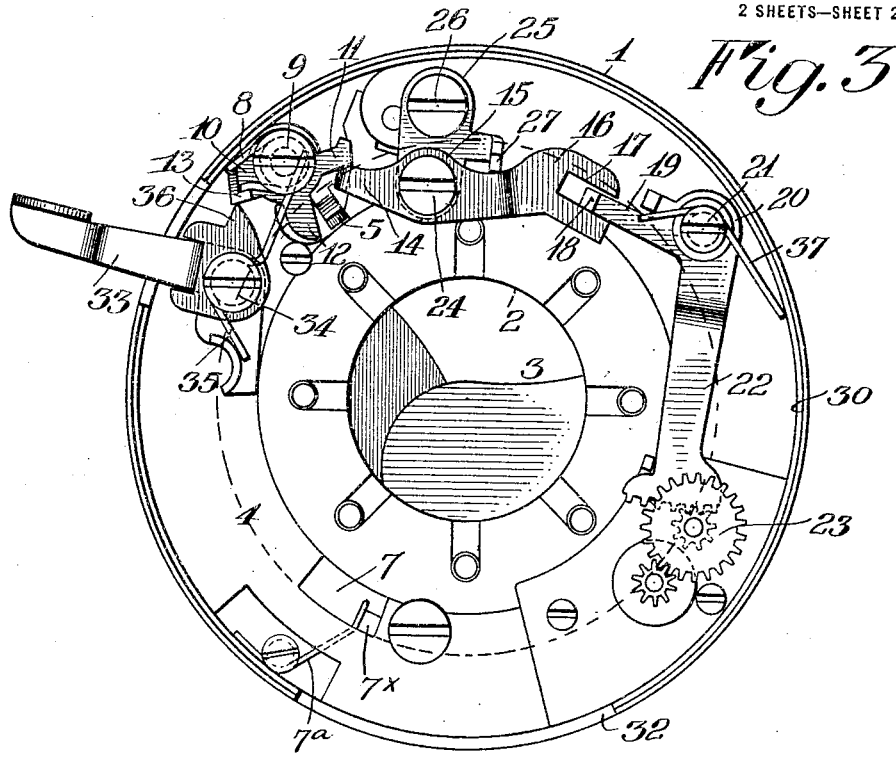
Fig. 3 is a view with the controlling mechanism removed and the parts in the positions assumed when the shutter is set and about to be tripped.

In the present embodiment, I have illustrated my invention as applied to an automatic shutter as distinguished from a set shutter but those skilled in the art will readily recognize features thereof applicable to both types of shutter. I have also omitted any showing of the cover plate or front and exterior parts as these may be of the usual construction. Referring first to Fig. 3 where the major elements can be more readily identified, due to the absence of the overlying controlling member, 1 indicates the usual annular shutter casing, 2 the lens opening and 3 the blades that operate in a plane beneath the usual floor or partition 4. I have not shown any details of the blade mechanism as it is of the usual type embodying an actuating ring 7 that is moved in one direction to close the blades and to normally hold them closed by a spring $7^a$ (Fig. 3) engaging a lug $7^x$ thereon. The ring may be operated in the other direction against the tension of the spring through the medium of a projection 5 thereon extending through a slot 6 in the partition 4.

The motive force for operating the shutter is supplied by a spring 8 coiled about a stud 9 and engaging a driving member 10 that rotates on the stud. This driving member has three arms 11, 12 and 13, the first mentioned of which is a stop arm normally abutting the adjacent wall of the shutter casing as shown in Fig. 1. The arm 12 is adapted for a slip-off engagement with the blade ring actuating projection 5, while the arm 13 is utilized in winding the motor spring 8, as hereinafter described.

The arm 12 is also adapted to engage with the arm 14 of an intermediate lever 15 which connects the driving member up with the retarding devices that control the duration of automatically timed exposures. The other arm 16 of the lever 15 is forked or slotted at 17 to take sliding engagement with a pin or projection 18 on the arm 19 of a lever 20 pivoted on a stud 21. The other arm 22 of this lever is a gear segment arm that meshes with a gear train indicated generally at 23. The inertia of this gear train constitutes the main retarding force. The pivot 24 of the intermediate lever 15 is carried on a swinging arm 25 pivoted at 26. An arm 27 on the arm 25 coöperates with a cam slot 28 in a controlling ring 29 that has a bearing in a rabbet or seat 30 in the edge of the annular casing 1. The ring is rotated by a finger piece 31 that projects through a cutaway portion 32 of the casing and may be in the form of an indicator for coöperation with a suitable scale, not shown. By this means, the intermediate lever 15 may be swung bodily to alter its relationship with both the arm 12 of the driving member and the arm 19 of the segment lever 20. If it is swung to the extreme right in the figures by a clockwise movement of the controlling ring 29, so that the projection 27 occupies the left end of the slot 28, the shutter is set for an instantaneous exposure or one of the shortest duration possible, for the following reasons:

The shutter is operated by the depression of a shutter operating lever 33 pivoted at 34 and normally held in the position of Fig. 1 by a spring 35. A shoulder 36 on this lever has a slip-off engagement with the arm 13 of the driving member 10. When the operating lever is depressed, as shown in Fig. 3, it rotates the driving member in a clockwise direction and energizes the spring 8, after which it immediately slips off of the arm 13 and allows the driving member to spring back to the position of Fig. 1. In doing so, the arm 12 engages the shutter ring projection 5 and opens the blades, after which it immediately slips off of the projection allowing the blades to close quickly under the influence of their own spring. The driving member is so constructed and mounted that it has a slight axial sliding movement on its stud so that it can ride over the projection 5 while being set. When the lever 15 is in the position shown in Fig. 1, as aforesaid, the arm 14 thereof has been swung out of the path of the arm 12 of the driving member so that it is not engaged thereby and the retarding device exerts no influence in opposition to the motor spring 8. The fast exposure described results.

Figure 4:
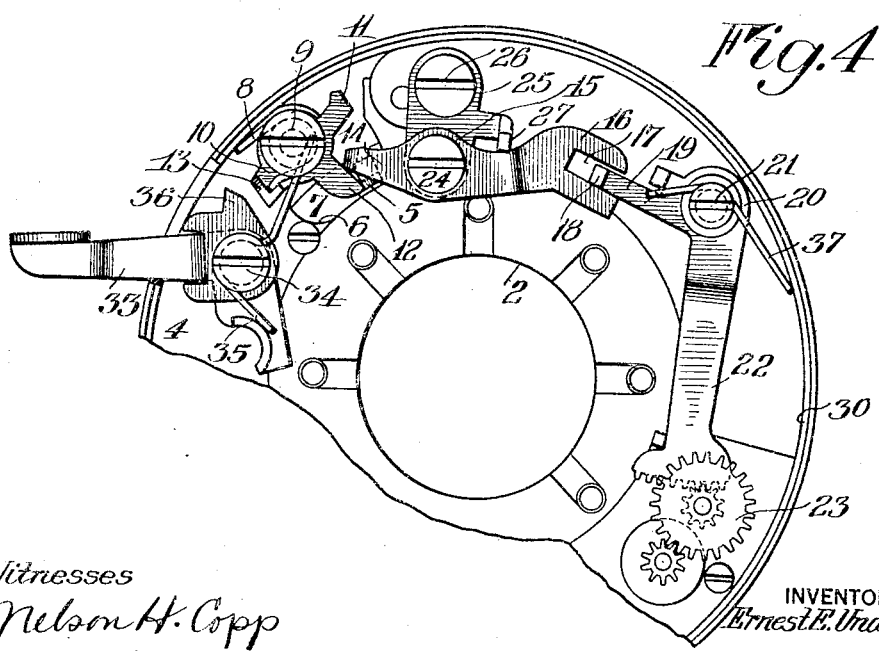
Fig. 4 is a fragmentary view similar to Fig. 3 showing the shutter open at the instant it is released for a closing of the blades under the influence of their own spring.

When the controlling ring 29 is moved in a counter-clockwise direction to the other extreme, as it is assumed to be in Figs. 2, 3 and 4, the intermediate lever 15 is swung to the left so that it is projected well into the path of the arm 12 of the driving member. This arm 12 first engages the blade ring projection 5, as before, and moves it without opposition until the shutter has been quickly opened. At this point, however, it comes into engagement with the arm 14 of the intermediate lever and in completing its rotation under the influence of the motor spring 8 and while still engaging the projection 5 to hold the blades open, it rocks the intermediate lever 15. In the meantime, during the setting movement of the operating member 33, the lever 15 has been released from the pressure of the arm 12 which it normally endures, as shown in Fig. 2 and a spring 37 acting on the segment lever 20 is permitted to swing the segment 22 from the position of Fig. 2 to that of Fig. 3, at the same time necessarily advancing the arm 14 of the intermediate lever in the path of the driving member. Therefore, upon this engagement of the driving arm 12 with the arm 14 of the intermediate lever, during the operation of the shutter and while the blades are opened, the lever 15, through the sliding connection at 17—18, rocks the segment arm 22 back to the position of Fig. 2, driving the gear train 23 and slowing up the action of the motor spring so that the period during which the blades are open is prolonged. Of course, the segment spring 37 also contributes to the retarding effect. By the time the stop arm 11 has abutted the casing and the driving arm 12 has slipped off of the blade ring projection 5, the segment has completed its swing and returned to the position of Fig. 2. In Fig. 4 the parts are represented as they appear during the period of retard.

It will be noted that by shifting the position of the intermediate lever 15 through the ring 29, the retarding force of the gear train 23 may be very delicately graded. As the lever is shifted in a direction in which the driving arm 12 contacts the arm 14 at a point nearer the center of movement of the former and to its mechanical disadvantage, the point of contact between the other arm 16 of the intermediate lever and the segment lever 20 is being increased, also to the mechanical disadvantage of the driving parts and to the mechanical advantage of the retarding element. As the lever is shifted in the other direction, the reverse result is multiplied in the same manner until the driving member is freed altogether from retarding opposition.

I claim as my invention:

1. In a photographic shutter, the combination with a blade mechanism and a driving member therefor, of a retarding device embodying a lever engaged by the driving member, and means for shifting the lever and its pivot bodily to vary the throw imparted thereto by the driving member.

2. In a photographic shutter, the combination with a blade mechanism and a driving member therefor, of a retarding device embodying an intermediate lever engaged by the driving member and a second lever having a sliding engagement with the first, and means for shifting the intermediate lever, bodily, to vary the throw imparted thereto by the driving member and to inversely affect the leverage between the intermediate lever and the last mentioned lever.

3. In a photographic shutter, the combination with a blade mechanism and a driving member therefor, of a retarding device embodying a gear train, a segment lever meshing therewith and an intermediate lever having one arm in sliding engagement with an arm of the segment lever and the other arm adapted to be engaged by the driving member, and means for shifting the intermediate lever, bodily, to vary the throw imparted thereto by the driving member and to inversely affect the leverage between the intermediate lever and the segment lever.

4. In a photographic shutter, the combination with a blade mechanism including a blade ring, a spring for operating in one direction to close the blades and a projection for operating it in the other direction, of a rotary driving member having three arms, one of which is a stop arm, and another of which is adapted to engage the ring operating member in opposition to its spring, a motor spring for the driving member, a shutter setting and operating member having a slip-off engagement with the other arm of the driving member, a gear train, a segment lever meshing therewith, an intermediate lever having one arm in sliding engagement with an arm of the segment lever and the other arm adapted to be engaged by the ring actuating arm of the driving member, and means for shifting the intermediate lever, bodily, to vary the throw imparted thereto by the driving member and to inversely affect the leverage between the intermediate lever and the segment lever.

ERNEST E. UNDERWOOD.